(12) United States Patent
Huang et al.

(10) Patent No.: US 8,958,699 B2
(45) Date of Patent: Feb. 17, 2015

(54) ONU WITH WIRELESS CONNECTIVITY CAPABILITY

(75) Inventors: Zhen Huang, Beijing (CN); David Hood, Palo Alto, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 540 days.

(21) Appl. No.: 13/053,925

(22) Filed: Mar. 22, 2011

(65) Prior Publication Data

US 2012/0243871 A1  Sep. 27, 2012

(51) Int. Cl.
*H04B 10/00* (2013.01)
*H04B 10/272* (2013.01)
*H04J 14/02* (2006.01)
*H04W 52/02* (2009.01)

(52) U.S. Cl.
CPC .......... *H04B 10/272* (2013.01); *H04J 14/0267* (2013.01); *H04J 14/0282* (2013.01); *H04W 52/0229* (2013.01); *H04W 52/0274* (2013.01); *H04W 52/0296* (2013.01)
USPC ........... 398/115; 398/116; 398/117; 398/153; 398/168

(58) Field of Classification Search
None
See application file for complete search history.

(56) References Cited

U.S. PATENT DOCUMENTS

| 2009/0148168 A1 | 6/2009 | Li et al. |
| 2010/0158525 A1* | 6/2010 | Walter ............................ 398/71 |
| 2011/0211837 A1* | 9/2011 | Sugawa et al. .................. 398/67 |

OTHER PUBLICATIONS

Burak Kantarci et al : "Towards energy-efficient hybrid Fiber-Wireless Access Networks", Transparent Optical Networks (ICTON). 2011 13th Internati onal Conference on, IEEE, Jun. 26, 2011, XP031911678, DOI: 10 .1109/ICTON.2011.5970786 ISBN: 978-1-4577-0881-7.

\* cited by examiner

*Primary Examiner* — Darren E Wolf

(57) ABSTRACT

The embodiments herein relate to a method in an optical network unit (103), referred to as an ONU, for providing wireless connectivity capability to the ONU (103). The ONU (103) is comprised in a communications network (100). The ONU (103) is interconnected to an optical line terminal (101), referred to as an OLT, via a wireline communications link (104) and a wireless communications link (113). The ONU (103) is configured to support a sleep mode. The ONU (103) obtains information about entry into the sleep mode. The ONU (103) identifies whether the wireless communications link (113) is activated or deactivated, and activates the wireless communications link (113) if the wireless communications link (113) is identified as deactivated. The ONU (103) enters sleep mode, and provides wireless connectivity capability to the ONU (103) by means of the wireless communications link during the sleep mode.

4 Claims, 13 Drawing Sheets

ONU WITH WIRELESS CONNECTIVITY CAPABILITY

TECHNICAL FIELD

Embodiments herein relate generally to an Optical Network Unit (ONU) and a method in the ONU, an Optical Line Terminal (OLT) and a method in the OLT and a method in a communications network.

More particularly the embodiments herein relate to providing wireless connectivity capability to the ONU.

BACKGROUND

A Passive Optical Network (PON) is a point-to-multipoint network architecture that brings optical fiber cabling and signals all or most of the way to the end user. A PON comprises an OLT at a service providers Central Office (CO) and a number of ONUs near end users. More than one ONU may be connected to the same OLT by means of passive or in some cases, active, intermediate elements. For example, up to 32 ONUs may be connected to an OLT. PONs are called passive because optical transmission requires no power or active electronic components. In other words, other than at the central office and subscriber/user endpoints, there are typically no active electronics within an access network. An access network is that part of a communications network which connects subscribers to their immediate service provider. It is contrasted with the core network. The core network is the central part of the communications network that provides various services to subscribers who are connected by the access network. Downstream signals, i.e. from the OLT to the ONU, are broadcasted to all users sharing a single fiber. Upstream signals are signals transmitted from the ONU to the OLT.

An ONU is a device that converts incoming downstream optical signals transmitted from the OLT via a wireline fiber optical communications channel, referred to as an optical link, into electrical signals. These electrical signals are then sent to individual subscribers over an optical fiber network, in order to provide telecommunications services. An ONU comprises an optical transceiver. The ONU may also be called an Optical Network Terminal (ONT), which is a special case of an ONU that serves a single subscriber.

As mentioned above, the ONU is used in combination with the OLT. The OLT performs conversion between the electrical signals used by the service provider's equipment and the fiber optic signals used by the PON. The OLT coordinates the multiplexing between the ONUs at or near the various subscriber locations.

PON system energy conservation has been embraced by the International Telecommunication Union (ITU) as a necessary goal. One target of the ITU is to explore potential solutions to improve energy conservation through reduced power consumption within optical access networks. These solutions may have impact on improving the equipment performance and service longevity in battery-powered operation, as well as on energy conservation and $CO_2$ emission in general.

The term power refers to the ability to do work, while the term energy is a measure of the amount of work done, that is, power time. Therefore, energy may be saved or conserved, while power may be reduced. Throughout the industry, the term power is commonly used to refer to both. It is to be understood in the following description that terms such as power saving imply power reduction for a period of time, with the purpose of energy saving.

Wireless communication is a fast growing segment of the communications industry. Wireless cellular systems have experienced exponential growth over the last decade. Many new applications are emerging from research ideas to concrete systems. This explosive growth of wireless systems coupled with the proliferation of devices such as smart phones indicate a bright future for wireless networks.

A current power saving mode conserves energy by implementing sleep cycles to completely power off the ONU optical transceiver at certain times. Thus, at any given time, the ONU may be in so-called sleep mode or so-called awake mode, and it may use a wake-up timer to change between the modes. In order to support ONU wake-up, sleep cycles are provisioned by the OLT, typically in the order of 10-100 milliseconds. Only when the sleep cycle expires, does a sleeping ONU have the chance to wake up to receive downstream traffic. During a sleep period, the OLT may buffer downstream traffic destined to the ONU. When there is no downstream traffic to a sleeping ONU, the ONU still has to be awakened when the wake-up timer expires, i.e. when the sleep interval expires. Frequently turning the optical transceiver on and off contributes to extra power consumption. When there is downstream traffic destined to an ONU, and the ONU is still in sleep mode, the OLT has to buffer the traffic until the wake-up timer expires. The necessary buffer memory adds cost and power consumption to the OLT.

Another power saving mode is power shedding, in which non-essential services are switched off when the ONU goes into battery operation mode after e.g. an alternating current (AC) power failure. Power shedding has the target to reduce the demand for battery power and prolong the survival time of the ONU, while still maintaining lifeline Plain Old Telephone Service (POTS). The current definition of power shedding mode still maintains the optical transceiver on, while just powering down other selected elements in the ONU. However, one of the main power consumption contributors in the ONU is the optical transceiver module. Additional energy may be saved by combining power shedding with sleep mode.

SUMMARY

The objective of embodiments herein is therefore to obviate at least one of the above disadvantages and to reduce power consumption in the communications network.

According to a first aspect, the objective is achieved by a method in an optical network unit, referred to as an ONU, for providing wireless connectivity capability to the ONU, which ONU is comprised in a communications network. The ONU is interconnected to an optical line terminal, referred to as an OLT, via a wireline communications link and via a wireless communications link. The ONU is configured to support a sleep mode. The ONU obtains information about entry into the sleep mode. The ONU identifies whether the wireless communications link is activated or deactivated, and activates the wireless communications link when the wireless communications link is identified as deactivated. The ONU enters sleep mode, and provides wireless connectivity capability to the ONU by means of the wireless communications link during the sleep mode.

According to a second aspect, the objective is achieved by a method in an optical line terminal, referred to as an OLT, for providing wireless connectivity capability to an optical network unit, referred to as an ONU, which OLT is comprised in a communications network. The OLT is interconnected to the ONU via a wireline communications link and via a wireless communications link. The OLT identifies bearer traffic to the ONU when ONU is in a sleep mode. The OLT buffers the identified bearer traffic. The OLT transmits information about exit out of sleep mode to the ONU via the wireless communications link. The OLT transmits, after the ONU has exited sleep mode, the buffered bearer traffic to the ONU using the wireline communications link, and provides wireless connectivity capability to the ONU by means of the wireless communications link during the sleep mode.

According to a third aspect, the objective is achieved by a method in a communications network for providing wireless connectivity capability to an optical network unit, referred to as an ONU. The communications network comprises an optical line terminal, referred to as an OLT. The OLT and the ONU are interconnected via a wireline communications link and via a wireless communications link. The OLT and the ONU is configured to support a sleep mode. The communications network exchanges control or management data or bearer traffic between the OLT and the ONU over the wireline communications link when the ONU is out of sleep mode, i.e. it is in awake mode. The communications network exchanges control or management data and bearer traffic between the OLT and the ONU over the wireless communications link when the ONU is in the sleep mode. The communications network provides wireless connectivity capability to the ONU by means of the wireless communications link when the ONU is in the sleep mode.

According to a forth aspect, the objective is achieved by an optical network unit, referred to as an ONU, for providing wireless connectivity capability to the ONU. Which ONU is comprised in a communications network. As mentioned above, the ONU is interconnected to an optical line terminal, referred to as an OLT, via a wireline communications link and via a wireless communications link. The ONU is configured to support a sleep mode. The ONU comprises an obtaining unit configured to obtain information about entry into the sleep mode and an identifying unit which is configured to identify whether the wireless communications link is activated or deactivated. Further, the ONU comprises an activating unit which is configured to activate the wireless communications link if the wireless communications link is identified as deactivated. The ONU comprises an entering unit configured to enter sleep mode, and a providing unit which is configured to provide wireless connectivity capability to the ONU by means of the wireless communications link during the sleep mode.

According to a fifth aspect, the objective is achieved by an optical line terminal, referred to as an OLT, for providing wireless connectivity capability to an optical network unit, referred to as an ONU, Which OLT is comprised in a communications network. The OLT is interconnected to the ONU via a wireline communications link and via a wireless communications link. The OLT comprises an identifying unit configured to identify bearer traffic to the ONU when the ONU is in a sleep mode. The OLT comprises a buffering unit which is configured to buffer the identified bearer traffic. Further, the OLT comprises a transmitting unit configured to transmit information about exit out of sleep mode to the ONU via a wireless communications link, and configured to transmit, after the ONU has exited sleep mode, the buffered bearer traffic to the ONU using the wireline communications link.

By integrating a wireless transceiver module into the ONU, it is provided with wireless connectivity capability, which enables improved power consumption in the communications network. The wireless connectivity capability may be utilized in cases such as for example PON signaling, applications handshakes and POTS calls in sleep mode, periodic maintenance, etc.

Embodiments herein afford many advantages, of which a non-exhaustive list of examples follows:

Embodiments herein enable wake up of the ONU in power saving or sleep mode via (wireless connectivity. This provides an adaptive wake-up management by monitoring traffic in the communications network.

When there is no downstream traffic to a sleeping ONU, the ONU may keep sleeping until it receives a wireless wake-up message from the OLT. During an ONU sleep period, no power is consumed by the optical transceiver.

When there is downstream traffic addressed to the ONU, the OLT wakes up the ONU via a wireless notification instead of waiting for a wake-up timer to expire. This improves the quality of service seen by the end user and reduces the amount of buffering needed at the OLT.

Embodiments herein provide the advantage of enabling POTS calls even when the optical transceiver is powered off, and without waking up the ONU. In power saving mode, which comprises e.g. power shedding and power sleeping, shutting down the optical transceiver saves power and prolongs battery availability. During sleep periods, OLT maintenance windows or fiber cut accidents, POTS calls thus remain available for customers, thereby additionally improving the reliability of the service.

Another advantage of embodiment herein is that periodic maintenance messages, such as Session Initiation Protocol (SIP) heartbeat and Internet Group Management Protocol (IGMP) query messages are carried over the wireless link between ONU and application servers without the need to awaken a sleeping ONU.

A further advantage of embodiments herein is that the ONU's wireless module remains in idle mode when there are no wireless messages between the ONU and the OLT, and thus saves additional power. Wireless connectivity consumes less energy than the optical transceiver.

Embodiments herein are not limited to the features and advantages mentioned above. A person skilled in the art will recognize additional features and advantages upon reading the following detailed description.

BRIEF DESCRIPTION OF THE DRAWINGS

Embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
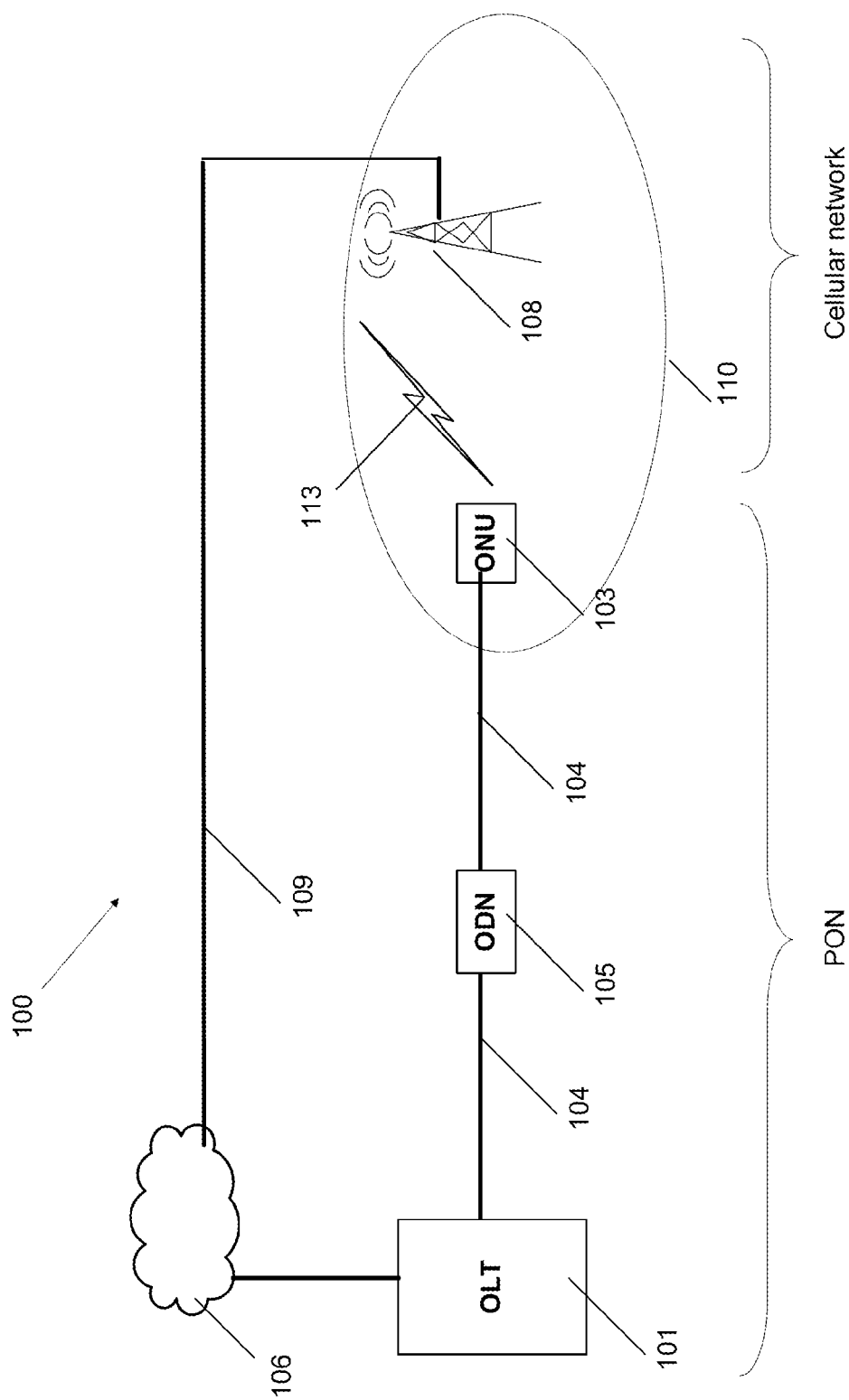
FIG. 1 is a block diagram illustrating embodiments of a communication network.

FIG. 1 depicts a communications network 100. The communications network 100 comprises a PON and a cellular network. Transmissions within the PON are typically performed between the OLT 101 and at least one ONU 103 via a PON wired fiber optical communications link. The PON wired fiber optical communications link will from now on be referred to as the optical link 104. The communications network 100 comprises i number of ONUs 103, where i is an integer from 1 upward. Between the OLT 101 and ONU 103 there is an Optical Distribution Network (ODN) 105 which comprises fibers and splitters. The OLT 101 generally resides in the central office of the operator of the network 100, and couples the optical access network to an aggregation network 106, through which the OLT 101 may additionally communicate with a Base Station (BS) 108 in the cellular network via a wireline communication link 109. The wireline communication link 109 is different from the optical link 104. The base station 108 serves a cell 110. The base station 108 may be a base station such as a NodeB, an evolved NodeB (eNB), or any other radio network unit. The cell 110 is a geographical area where radio coverage is provided by the base station 108 at a base station site. Each cell 110 is identified by an identity within the local radio area, which is broadcast in the cell 110.

The ONU 103 may be located in the residence of a customer. The ONU 103 may also be of different types having different purposes, such as a Multi-Dwelling Unit (MDU) which is usually used for Fast Fourier Transform (FTT) Building, FTTBusiness and FTTFloor deployment, whereas a Single Family Unit (SFU) ONU is adapted for residential use etc. All of these ONU types may be under the coverage of the cellular network. The ONU 103 may have a wireless connectivity capability with the Base Station 108 in the cellular network by integrating a wireless transceiver module with the ONU 103. Thus, the base station 108 has a wireless communication link 113 to the ONU 103.

The cellular network may use technologies such as Long Term Evolution (LTE), Global System for Mobile Communications (GSM), Worldwide Interoperability for Microwave Access (WiMAX), Universal Terrestrial Radio Access Network (UTRAN) etc. It should be noted that the wireless link 113 between the base station 108 and the ONU 103 may use any suitable protocol depending on type and level of layer, e.g. as indicated by the Open Systems Interconnection (OSI) model, as understood by the person skilled in the art.

The user equipment (not shown) may be any suitable communication device or computational device with communication capabilities connected to a wired port of the ONU 103. The user equipment may comprise for example a telephone, a Personal Computer (PC), a television etc.

Figure 2:
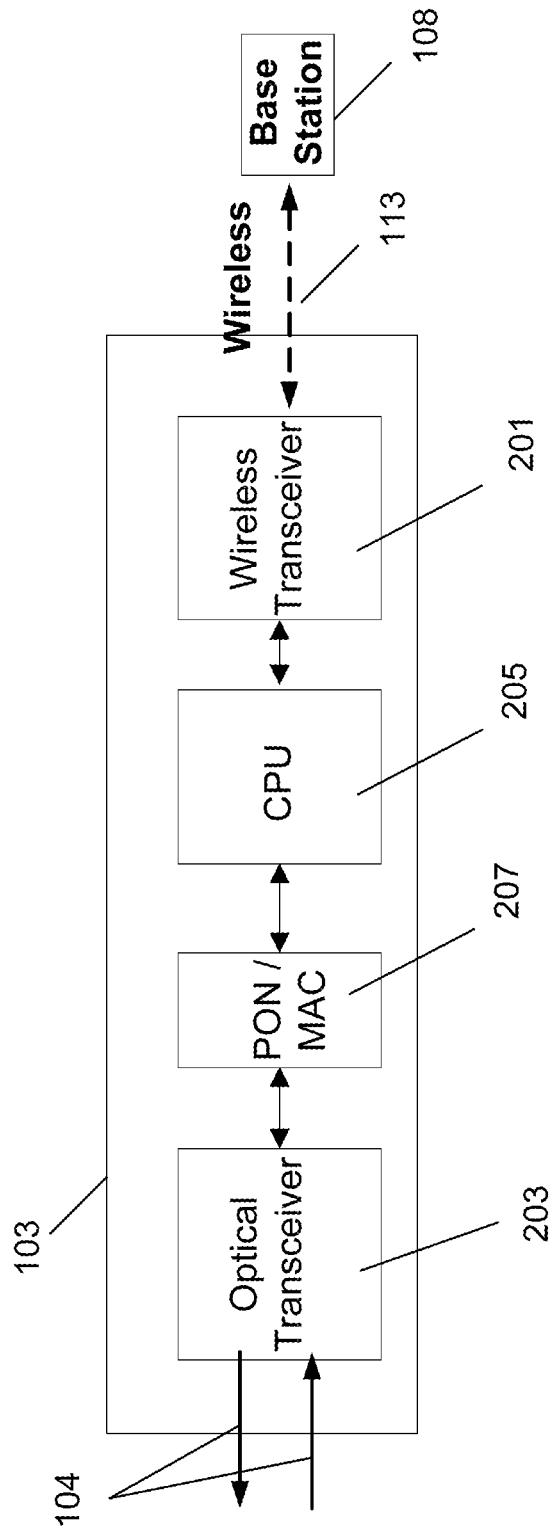
FIG. 2 is a block diagram illustrating embodiments of an ONU.

As mentioned above and as illustrated in FIG. 2, the ONU 103 comprises a wireless transceiver 201 configured to transmit and receive wireless signaling, system control or management data and bearer traffic to and from the OLT 101 via the base station 108 over the wireless link 113. By accessing the cellular network using the wireless link 113, an alternative communication link between ONU 103 and OLT 101 is provided in addition to the optical link 104. The ONU 103 further comprises an optical transceiver 203 configured to transmit and receive wired optical signals, traffic and data to and from the OLT 101 over the optical link 104. The wavelength of the transmitted optical signals may for example be 1310 nm, and the wavelength of the received optical signals may be for example 1490 nm. As seen in FIG. 2, the ONU 103 further comprises a processing unit, such as e.g. the Central Processing Unit (CPU) 205. The CPU 205 carries out the functions of the ONU 103 according to sequential instructions in a program stored in the ONU 103. The ONU 103 comprises a PON Media Access Controller (PON/MAC) 207 providing addressing and channel access control mechanisms that make it possible for several ONUs 103 to communicate within the multi-point network that is a PON.

In addition to the wake-up mechanisms defined by for example the ITU, which may be based on timers or local traffic at the ONU 103, the ONU 103 has an adaptive wake-up mechanism using wireless based wake-up signaling. The ONU 103 may be in different modes, e.g. a sleep mode or an awake mode. The sleep mode may also be referred to as sleep state and the awake mode may also be referred to as awake state. The awake mode may also be referred to as out of sleep mode. These modes may provide e.g. reduced energy consumption. A sleep mode refers to a low power mode, which saves significant electrical energy consumption compared to leaving the optical transceiver device 203 fully on. The awake mode refers to a state when the optical transceiver device 203 is on, i.e. the opposite of sleep mode, and in which the ONU 103 is fully capable of providing all telecommunications services via the optical link 104, but with increased energy consumption. In the ONU sleep mode, both the ONU optical transmitter and ONU optical receiver, i.e. the ONU optical transceiver 203, are turned off. The wireless transceiver 201 consumes less energy than the optical transceiver 203, and remains active during ONU sleep mode.

The method for providing wireless connectivity capability to the optical network unit 103, according to some embodiments will now be described with reference to the combined signaling diagram and flowchart depicted in FIG. 3. The method comprises the following steps, which steps may as well be carried out in another suitable order than described below.

Step 301

The ONU 103 is awake, i.e. it is not in any power saving mode, and the wireless transceiver 201 of the ONU 103 is deactivated by default.

Step 302

The wireless transceiver 201 of the ONU 103 is activated when the ONU 103 is ready to enter power saving mode.

Step 303

The ONU 103 enters power saving mode, i.e. sleep mode.

Step 304

During the sleep mode, the ONU 103 transmits and receives communication to and from the OLT 101, using the activated wireless transceiver 201, the wireless communication link 113 and the base station 108.

The ONU 103 may use the wireless transceiver 201 for different reasons. Some of the reasons may be energy saving requirements from the operator, AC power failure, maintenance of the OLT 101, fiber cut of the PON link 104 etc. Some of these examples are described in more detail below.

The communication may be data traffic, messages, signaling or any other type of communication between the ONU 103 and the OLT 101.

The wireless communication link 113 may be used for control or management data and high-priority bearer traffic, such as Voice over Internet Protocol (VoIP) traffic.

Step 305

The ONU 103 leaves the energy saving mode and enters the awake mode. The reason for the ONU 103 to leave the energy saving mode may be e.g. restored AC power, timer expiration, etc. In the embodiments herein, an additional reason to awaken is that the ONU receives a wake-up message from the OLT via the wireless link 113. This is not possible in a traditional ONU configuration that contains only an optical link 104.

Step 306

During the awake mode, the ONU 103 communicates with the OLT 101 via the optical link 104, using the optical transceiver 203.

Bearer traffic is an example of a type of communication that is communicated via the optical link 104. When the ONU 103 is in awake state, it may use the optical link 104 for all communications with the OLT 101.

The wireless transceiver 201 may be deactivated when the ONU 103 leaves the power saving mode. In some embodiments, the ONU may go in and out of sleep mode fairly frequently, and therefore the wireless transceiver 201 may remain enabled. In other embodiments, where the ONU 103 is intended to remain awake for an extended period, the wireless transceiver 201 may be disabled.

Figure 3:
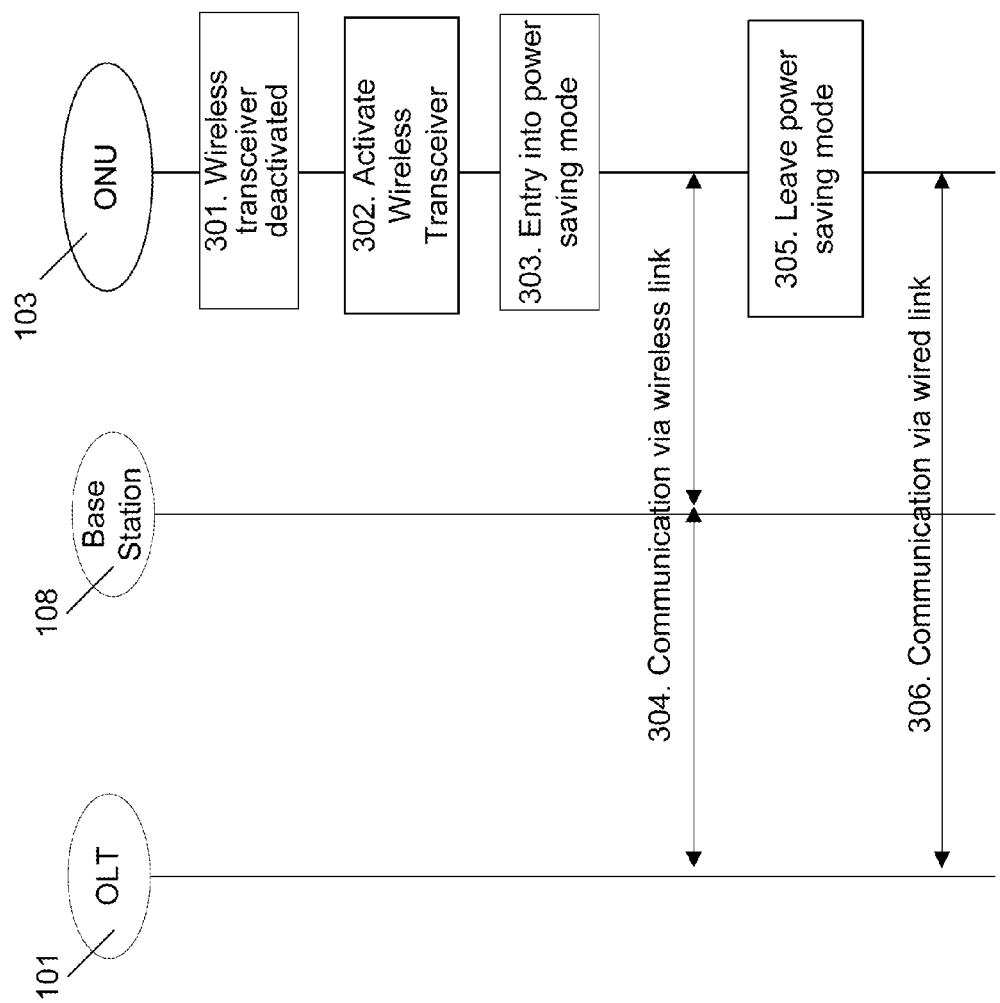
FIG. 3 is a combined schematic block diagram and flowchart depicting embodiments of a method.

The following description provides example embodiments and details of the method described in FIG. 3 applied to different types of traffic, i.e. system control traffic, high-priority voice bearer traffic and control or management data. The example embodiments described below are System control, e.g. adaptive wake-up mechanism by wireless-based wake-up signaling.

High-priority voice bearer traffic, e.g. POTS calls in power shedding and power sleep mode without awakening the optical transceiver.

Control or management data, e.g. periodic maintenance messages.

System Control Traffic—Adaptive Wake-Up Mechanism by Wireless-Based Wake-Up Signaling When the ONU 103 is in power saving mode, the OLT 101 may monitor traffic status of all ONUs 103 in the communication network 100 that are in sleep mode. When there is enough downstream bearer traffic, e.g. Ethernet traffic, directed to the sleeping ONU 103, the OLT 101 will send a wireless wake-up message via the base station 108 to the ONU 103 to the optical transceiver 203 to receive the buffered downstream bearer traffic. When there is not enough downstream bearer traffic to warrant awakening the ONU 103, the OLT 101 may leave the ONU 103 in sleep mode. In this way, an ONU 103 with wireless connectivity 113 provides an adaptive wake-up mechanism, and thus enables increased power saving.

Traffic that may be transferred via the wireless link 113 without awakening the ONU 103 comprises for example, single message exchanges such as keep-alive heartbeats or handshakes with e.g. SIP servers or just between the OLT 101 and the ONU 103 to confirm the health of the PON and/or the wireless link 113; small numbers of messages such as IGMP queries, i.e. downstream from the OLT 101, and IGMP responses, i.e. upstream from the ONU 103. These are cases in which the OLT 101/ONU 103 may exercise intelligence in examining the bearer traffic to determine the type of traffic and whether it is merely the first packet in a large stream, or whether it is one of only a very limited number of packets to be exchanged. Another example is the choice to carry POTS calls over the wireless link 113 rather than awakening the ONU 103, based again on intelligence in the OLT 101/ONU 103 that—although there may be a continuing stream of packets to exchange between the OLT 101 and the ONU 103—the packet rate is comfortably within the channel capacity of the wireless link 113 and does not justify awakening the ONU 103 and activating its high-speed optical link 104.

Figure 4:
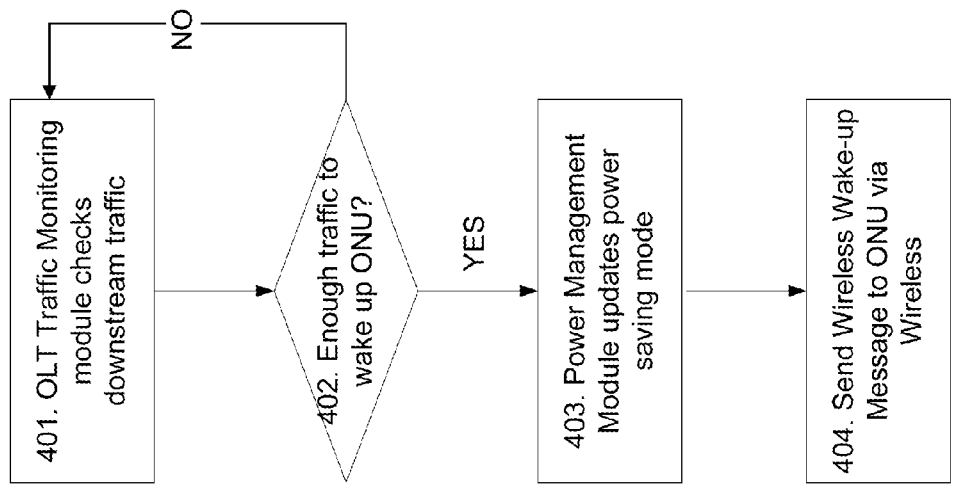
FIG. 4 is a flowchart depicting embodiments of a method.
Figure 5:
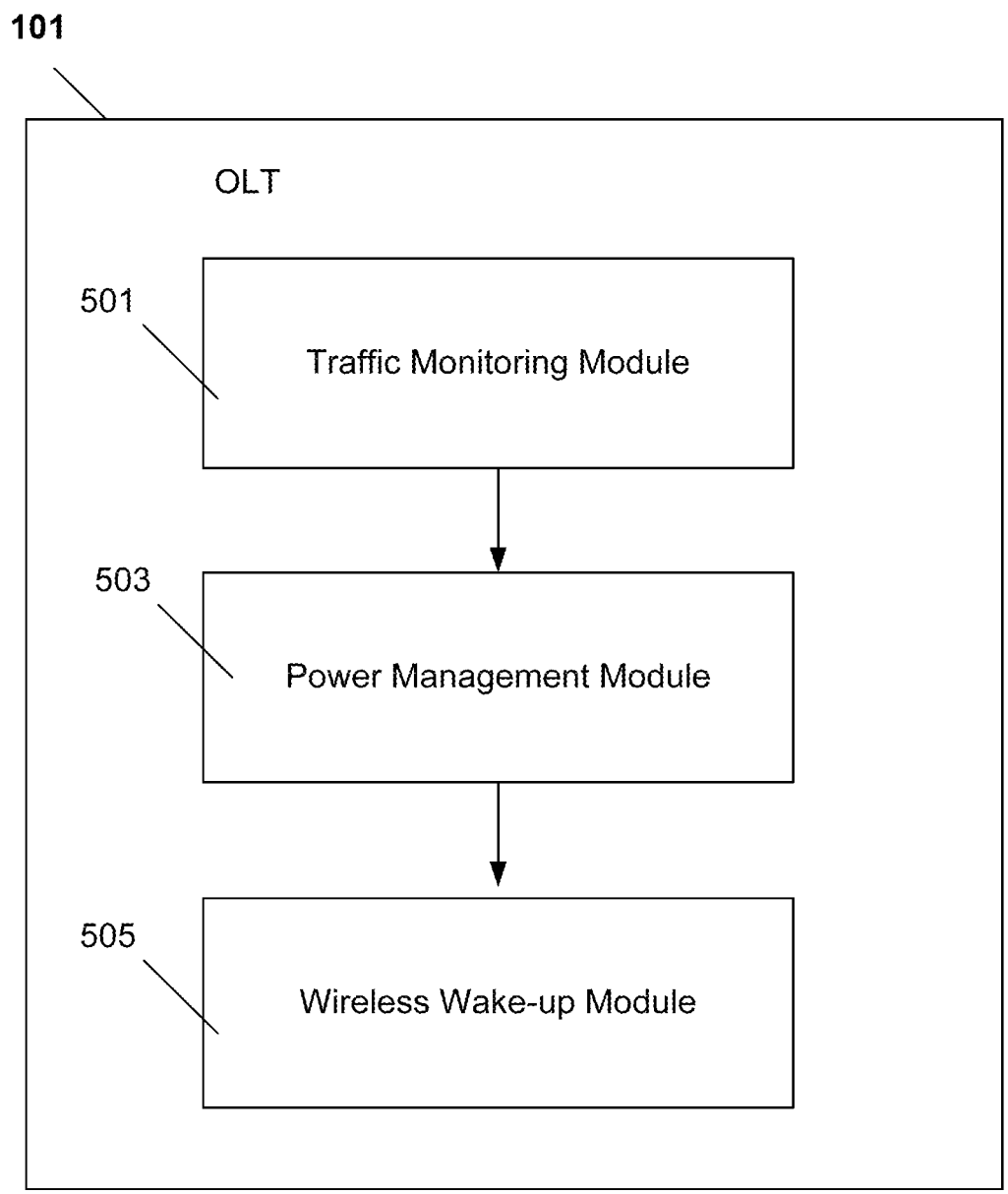
FIG. 5 is a block diagram illustrating embodiments of an OLT.

A method in the OLT 101 for providing wireless connectivity capability to the ONU 103, according to some embodiments will now be described with reference to the flow chart depicted in FIG. 4 depicting embodiments of the method for an OLT monitoring process, and with reference to FIG. 5 depicting embodiments of the OLT 101. The OLT 101 comprises a Traffic Monitoring Module 501, Power Management Module 503 and Wireless Wake-up Module 505. The modules comprised in the OLT 101 will be described in more detail below. The method comprises the following steps, which steps may as well be carried out in another suitable order than described below.

Step 401

The Traffic Monitoring Module 501 monitors downstream traffic from the OLT 101 to the ONU 103. Further, the Traffic Monitoring Module 501 may also classify the type of incoming downstream traffic, e.g. distinguishing characteristics of bearer traffic such as IPTV or VoIP, and system Control or Management data.

Step 402

If the incoming downstream traffic is bearer traffic, the Traffic Monitoring Module 501 in the OLT 101 determines if there is enough traffic to warrant activating the optical transceiver 203 in the ONU 103. The cases where the incoming downstream traffic is high-priority bearer traffic such as VoIP traffic or Control or Management data will be described in more detail below.

If there is enough downstream traffic, i.e. yes, the method proceeds to step 403.

If there is not enough downstream traffic, i.e. no, the method goes back to step 401 and the OLT 101 will keep monitoring the downstream traffic. The OLT 101 may transmit smaller amounts of traffic may to the ONU 103 using the wireless transceiver 201, rather than buffering it.

Step 403

A Power Management Module 503 updates the OLT's 101 record of the power saving mode of the ONU 103, i.e. updates the mode from sleep to awake. The OLT 101 may contain a state table for keeping track of the state of the ONU 103. For each ONU 103, the state table may have the parameter "sleep" or "awake". The state table may be stored in a computer readable memory in the OLT 101.

Step 404

This step corresponds to steps 304 and 305 in FIG. 3.

If the OLT 101 determines that the ONU 103 should be awakened, the wireless wake-up module 505 in the OLT 101 may send a wireless wake-up message to the ONU 103 via the cellular network, i.e. via the wireless link 113, to turn on the optical transceiver module 203 in the ONU 103. Thus, the wireless transceiver 201 in the ONU 103 receives the wireless wake-up message from the OLT 101 and is able to awaken upon demand from the OLT 101, rather than only upon timer expiration or other local stimulus.

Figure 6:
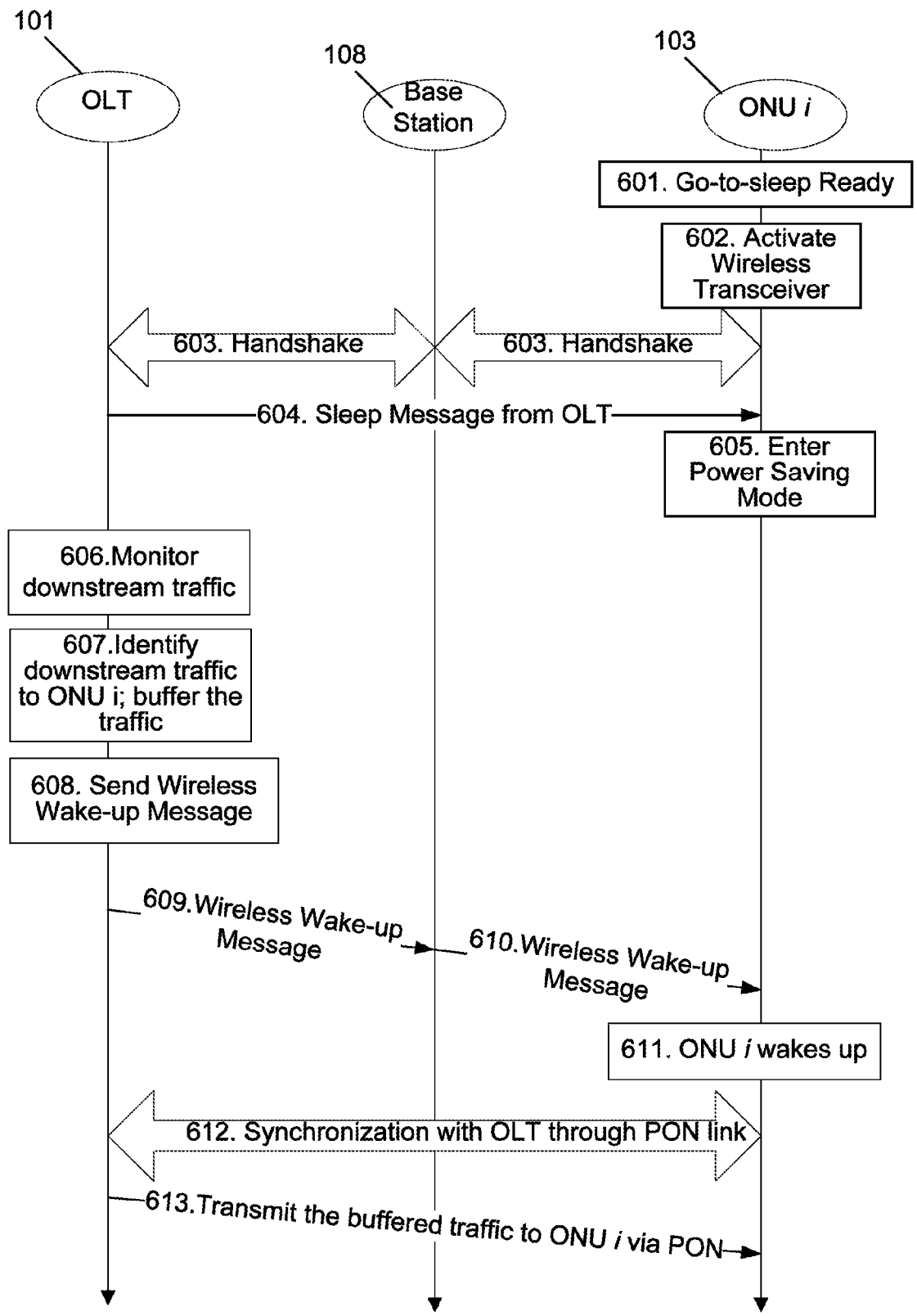
FIG. 6 is a combined schematic block diagram and flowchart depicting embodiments of a method.

FIG. 6 is a combined signaling diagram and flowchart depicting an embodiment of a method for an ONU wake-up sequence through the wireless based wake-up signaling when there is downstream traffic from the OLT 101 to the ONU 103. When the ONU 1103 is ready to go into sleep mode, it will activate the wireless transceiver 201 first and then exchange a handshake with the OLT 101 through wireless connectivity 113. The handshake is passed through the base station 108. After the handshake, the ONU i 103 enters the power sleep mode and the OLT 101 monitors downstream traffic to identify which ONU 103 may need to be awakened. If there is downstream traffic for the ONU 103, the OLT 101 will first buffer the downstream traffic to the ONU i 103 and send a wake-up message via the wireline communication link 109 to the base station 108, thence to the ONU 103. After turning on the optical transceiver 203, the ONU 103 will synchronize with the OLT 101 through the PON link 104 and then power off the wireless transceiver 201. Synchronization comprises the process of recovering PON timing on the part of the ONU 103, confirming the ability of the ONU 103 to sustain communications on the optical link 104, and possibly adjusting the ONU's 103 equalization delay on the part of the OLT 101. The OLT 101 will transmit buffered downstream traffic to the ONU 103 via the optical link 104 after synchronization is complete. The method comprises the following steps, which steps may as well be carried out in another suitable order than described below.

Step 601

The ONU 1103 is ready to go to sleep, i.e. to go into power sleep mode. In some embodiments, the ONU 103 may make a local decision to go to sleep, or the OLT 101 may send a message to remind the ONU 103 to go to sleep.

Step 602

The ONU 1103 activates its wireless transceiver 201.

Step 603

The ONU i 103, which is ready to go to sleep mode exchanges a handshake with the OLT 101 via the wireless link 113 or the optical link 104. The purpose of the handshake is to confirm the health of the wireless link 113 and coordinate the pending transition into sleep mode by the ONU 103.

Step 604

In some embodiments, the OLT 101 transmits a sleep message to the ONU 1103. This step may be unnecessary if the ONU 103 has been permitted to enter sleep mode as its own local decision.

Step 605

This step corresponds to step 303 in FIG. 3.

The ONU 103 enters sleep mode, in some embodiments after receiving the sleep message from the OLT 101 in step 604, Step 606

The OLT 101 monitors the downstream traffic in the communication network 100.

Step 607

This step corresponds to step 402 in FIG. 4.

The OLT 101 identifies that there is downstream traffic to sleeping ONU 1103, and analyzes the traffic and determines whether to buffer it, or to forward it over the wireless link 113. The OLT 101 may buffer some bearer traffic until the optical transceiver 201 in the ONU 103 is awake. Control or management data and high-priority bearer traffic may be transmitted over the wireless link 113.

Step 608

This step corresponds to step 404 in FIG. 4.

The OLT 101 decides that ONU 1103 should be awakened, i.e. leave sleep mode, and sends a wireless wake-up message to the ONU i 103 via the base station 108.

Step 609

This step corresponds to step 304 in FIG. 3.

As mentioned in relation to FIG. 1, the OLT 101 is connected to the base station 108 via a wireline communication link 109. The OLT 101 transmits a wireless wake-up message to the ONU 1103 using the wireline communication link 109 between the OLT 101 and the base station 108.

Step 610

This step corresponds to step 304 in FIG. 3.

The base station forwards the wireless based wake-up message to the ONU 1103 via the wireless link 113.

Step 611

ONU i 103 exits out of sleep mode and wakes up, i.e. the optical transceiver 203 is turned on.

Step 612

After turning on the optical transceiver, ONU 103 may synchronize with the OLT 101 through the optical link 104. The purpose of synchronization is to confirm communications capability between OLT 101 and ONU 103, and to adjust the ONU's equalization delay if necessary.

Step 613

The OLT 101 transmits the buffered downstream traffic to ONU via the optical link 104 after it has synchronized with the ONU 103 in step 612.

In some embodiments the wireless transceiver 201 may be left on even though the traffic is transmitted via the optical link 104, and in some embodiments the wireless transceiver 201 is powered off in that situation. The decision may be dynamic, e.g. based on assessment of the current traffic environment by the OLT 101 and/or the ONU 103, and a prediction of the likelihood of immediately returning to sleep mode or remaining awake for an extended time.

Figure 7:
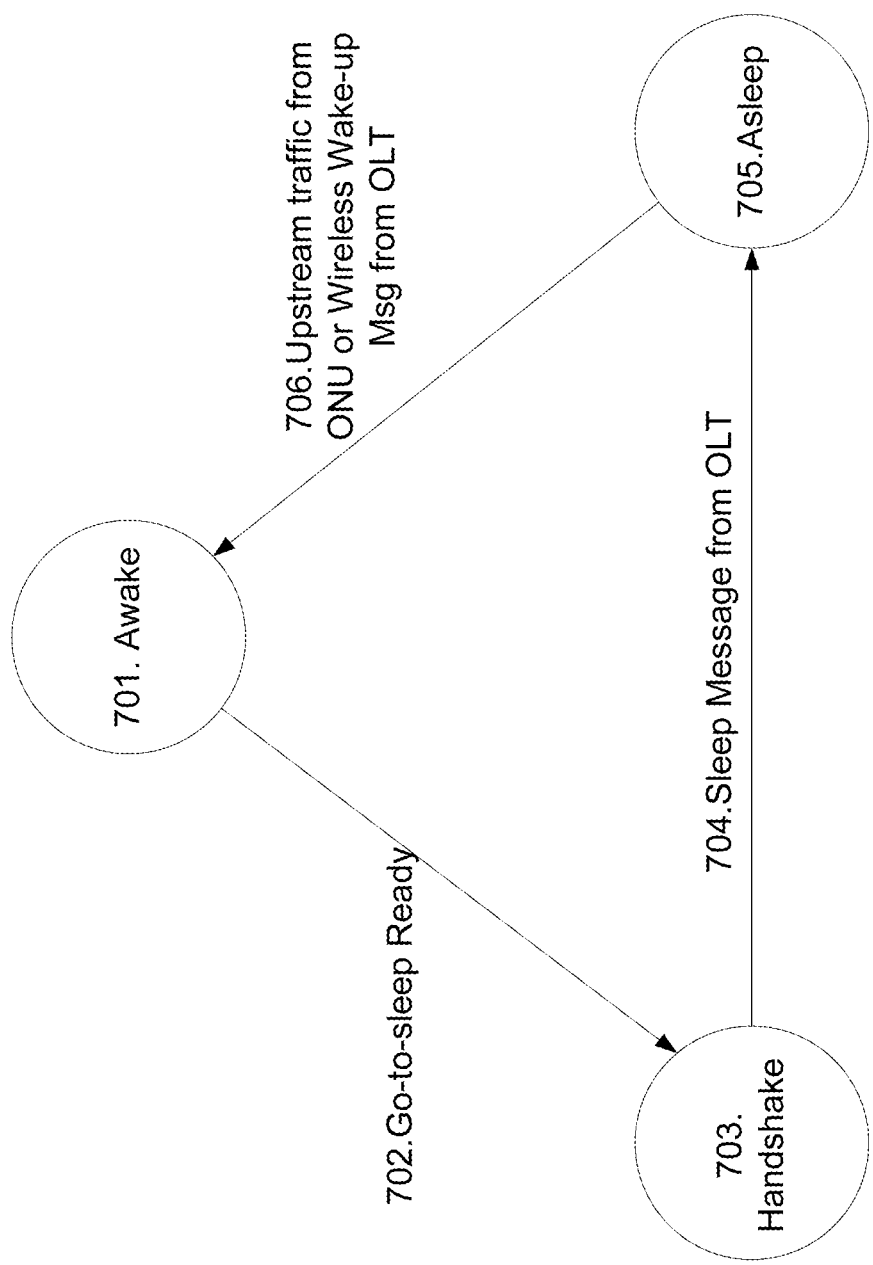
FIG. 7 is a flowchart depicting embodiments of a method.

FIG. 7 depicts embodiments of a method illustrating an ONU 103 sleep mode state transition.

Step 701

This state corresponds to step 306 in FIG. 3

The ONU 103 is in the awake mode. In the "Awake" state 701, the ONU 103 is fully responsive, forwarding downstream traffic received on the optical link 104 and responding to all bandwidth allocations from the OLT 101 to transmit upstream data via the optical link 104.

Step 702

This step corresponds to step 601 in FIG. 6.

The ONU 103 is ready to go to sleep, i.e. to enter sleep mode. The "Go-to-sleep Ready" indication may be obtained internally within the ONU 103 or externally from e.g. the OLT 101:

ONU 103 may make a local decision to go to sleep;

OLT 101 may send a message to remind the ONU 103 to go to sleep.

Step 703

This state corresponds to step 603 in FIG. 6.

The ONU 103 activates the wireless transceiver 201 and exchanges a handshake with the OLT 101 to confirm the health of the wireless link and the pending transition into sleep mode. In the "Handshake" state 703, the ONU optical transceiver 201 remains on.

Step 704

This step corresponds to step 604 in FIG. 6.

After the handshake the OLT 101 will send the "Sleep" message to place the ONU 103 into sleep mode. This message is optional. In some embodiments, the ONU 103 may use handshake completion as a trigger to enter sleep mode without an additional message from the OLT 101.

Step 705

In "Asleep" state, the optical transceiver 203 is turned off. The ONU 103 retains wireless connectivity with the OLT 101.

Step 706

This step corresponds to steps 401-404 in FIG. 4 and steps 609-610 in FIG. 6.

Examples of conditions to wake up the ONU 103 from sleep mode may be:
1. Downstream traffic to the ONU 103.
2. Upstream traffic from the ONU 103.

The decision to awaken the ONU 103 may depend on analysis of the traffic type. Both the upstream traffic and the downstream traffic may be of different types, such as for example:
- a. Bearer traffic that might wake up the ONU 103.
- b. High-priority voice traffic that may be transmitted through wireless connectivity and that does not wake up the ONU 103.
- c. Control or Management data which is transmitted through wireless connectivity and that does not wake up the ONU 103.

External stimuli may cause exit from sleep mode earlier than would have been the case if e.g. timer expiration were the only means. External stimuli may comprise, without limitation, control or management data or the arrival of bearer traffic intended to be conveyed in either direction between the OLT 101 and the ONU 103. The possibility that events at the OLT 101 cause wake-up at the ONU 103 through the wireless wake-up message is the feature disclosed in the embodiments herein.

High-Priority Bearer Traffic—POTS Call in Energy Saving Mode without Awakening Optical Transceiver Another example embodiment of the method described in FIG. 3 is a POTS call in a power saving mode, which describes a method to deal with high-priority bearer traffic. In a power saving mode due to e.g. AC power failure, the ONU 103 with wireless connectivity is still able to access the cellular network to provide POTS calls any time.

In this way, the ONU 103 with wireless connectivity provides longer battery backup time for power shedding mode and provides increased energy saving in sleep mode.

In existing art, when the AC power to the ONU 103 is down, a power shedding feature may power off the non-essential functions and services of the network 100 while the optical transceiver 203 of the ONU 103 is still on. The network 100 may comprise an auxiliary source of power, such as a backup battery, which charges while the power grid is in operation, and which provides power to the network units during power outages. Backup battery devices have only a relatively limited amount of energy available before the network units or other device must be shut down. Once the battery has discharged, it is too late to shut down the network units gracefully, and no emergency communications are possible. Some units or devices in the network 100 are more important than others in terms of the criticality of keeping them powered up during a power outage. Moreover, different devices have different power requirements, which may result in faster than necessary discharge of the auxiliary power source, e.g. the battery. When the AC power is down, the auxiliary power source needs to shed specified loads at specified times and in specified order.

Figure 8:
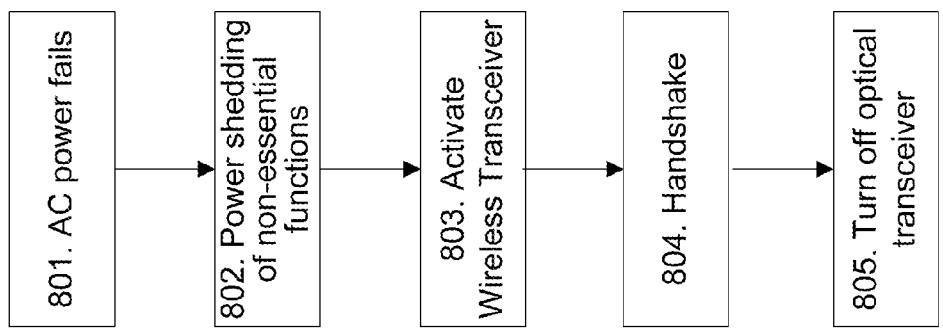
FIG. 8 is a flow chart illustrating embodiments of a method.

In the embodiments herein, the knowledge at the ONU 103 of a power failure, or also of a failure or maintenance action on the PON or the optical link 104, may be taken as an additional input criterion that allows power shedding and sleep mode to be combined, whereby the optical transceiver 203 is powered down more aggressively than would have been the case otherwise, and the wireless link 113 is used for wider purposes than would have been the case otherwise. For example, by activating the wireless transceiver 201 in the ONU 103 and then turning off the optical transceiver 203, POTS calls are still provided even though the ONU 103 is in maximum power saving mode. This is illustrated in the flow diagram in FIG. 8. FIG. 8 shows AC power failure as an example of a reason for a power saving mode. However; any other reason for power saving mode is also applicable, such as e.g. maintenance, general power saving requirements, fiber cut etc. The method, in the ONU, comprises the following steps, which steps may as well be carried out in another suitable order than described below.

Step 801

This step corresponds to step 301 in FIG. 3.

As an example, the AC power to the ONU 103 fails. The ONU 103 may continue to operate for a limited amount of time through the availability of a local energy storage device such as a backup battery. Loss of AC power may initiate power shedding. The AC power may be lost for a short or long period of time.

Step 802

Power saving of non-essential functions of the ONU 103 is initiated. Power saving of non-essential functions may imply that low-priority/high-volume traffic is discarded in both directions, upstream and downstream. Examples of non-essential functions may be for example high-speed internet access and video service. Both of these imply large volumes of traffic, but are generally low priority, and should be discarded rather than buffered or sent via the wireless link 113. As a distinguishing feature from the previous examples, the ONU 103 may, on the basis of information obtained in step 801, abbreviate the intervals or re-prioritize the criteria that it uses to determine its entrance to sleep mode.

Step 803

This step corresponds to step 302 in FIG. 3, step 602 in FIG. 6 and step 701 in FIG. 7.

The ONU 103 activates its wireless transceiver 201 if it is not already active.

Step 804

This step corresponds to step 603 in FIG. 6.

The ONU 103 exchanges handshakes with the OLT 101 via the wireless link 113.

Step 805

This step corresponds to step 303 in FIG. 3, step 605 in FIG. 6 and step 705 in FIG. 7.

The optical transceiver 203 in the ONU 103 is turned off, i.e. the ONU 103 enters sleep mode. As the wireless transceiver 201 is activated, step 803, wireless link 113 may handle essential tasks such as POTS calls even though the ONU 103 is in sleep mode.

Control-or-Management Data—Periodic Maintenance Message

Control or Management data may comprise periodic maintenance messages like SIP heartbeat and Internet Group Management Protocol (IGMP) query messages, which may be carried over the wireless link 113 between the ONU 103 and application servers, without awakening the ONU 103. For IGMP, the IGMP server will periodically send a multicast IGMP query to update its list of active groups. For VoIP service, a heartbeat message is periodically exchanged with the SIP server to keep the session alive. Even the continued health and availability of the wireless link 113 needs to be occasionally confirmed with a handshake. Such heartbeat exchange messages between ONU 103 and the OLT 101 or external application servers may be carried over the wireless link 113 without awakening the ONU 103.

Figure 9:
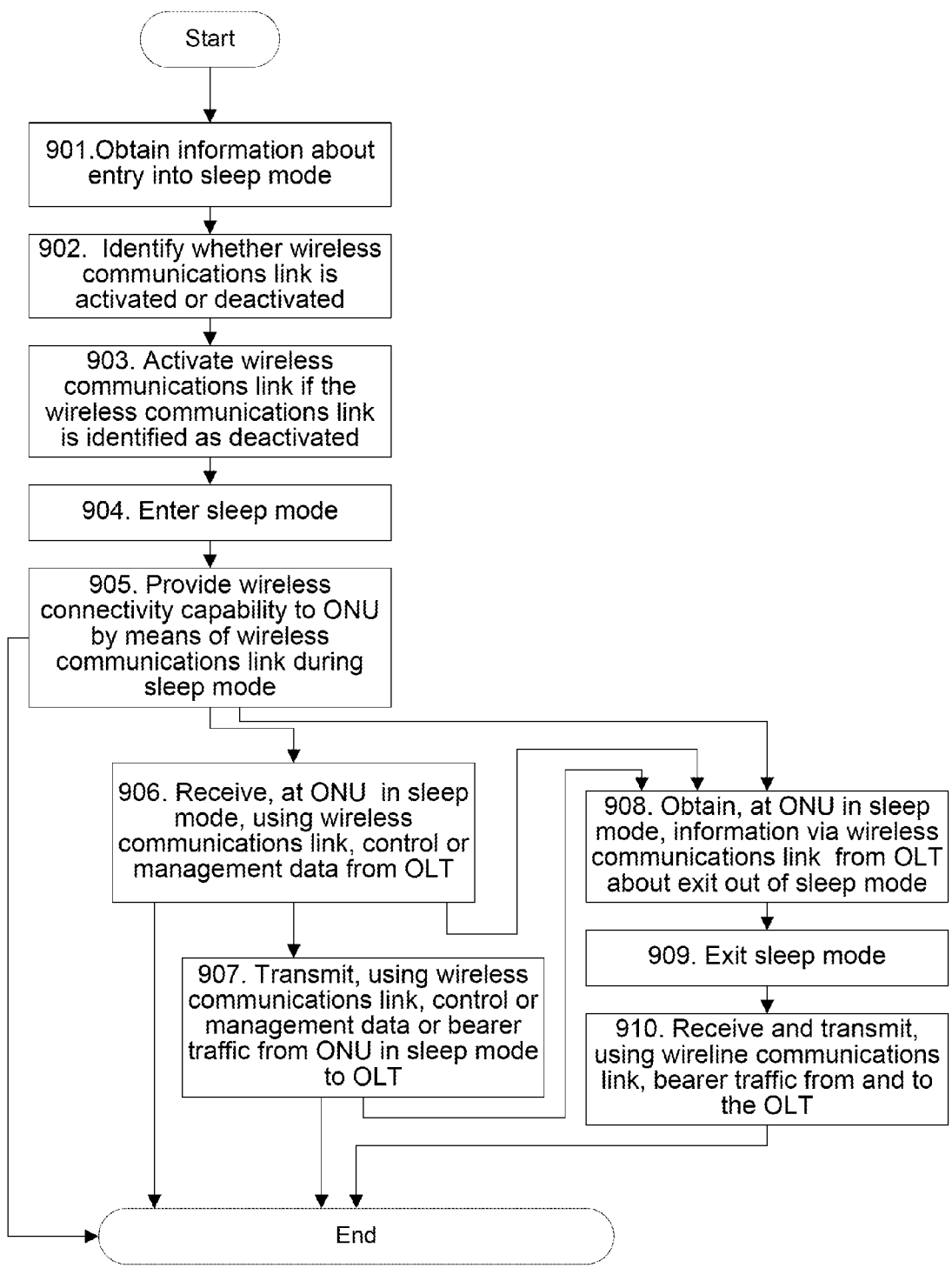
FIG. 9 is a flowchart depicting embodiments of a method in an ONU.

The method described above will now be described seen from the perspective of the ONU 103. FIG. 9 is a flowchart describing the present method in the ONU 103 in a communications network 100, for providing wireless connectivity capability to the ONU 103. As mentioned above the ONU 103 is being interconnected to an optical line terminal 101, referred to as an OLT, via a wireline communications link 104 and a wireless communications link 113. The ONU 103 is configured to support a sleep mode. The method comprises the further steps to be performed by the ONU 103:

Step 901

This step corresponds to step 604 in FIG. 6.

The ONU 103 obtains information about entry into the sleep mode.

Step 902

The ONU 103 identifies whether the wireless communications link 113 is activated or deactivated.

Step 903

This step corresponds to step 302 in FIG. 3, step 602 in FIG. 6 and step 803 in FIG. 8.

The ONU 103 activates the wireless communications link 113 if the wireless communications link 113 is identified as deactivated.

Step 904

This step corresponds to step 303 in FIG. 3, step 605 in FIG. 6 and step 804 in FIG. 8.

The ONU 103 enters sleep mode.

Step 905

The ONU 103 provides wireless connectivity capability to the ONU 103 by means of the wireless communications link 113 during the sleep mode.

Step 906

This step corresponds to step 304 in FIG. 3.

In some embodiments, the ONU 103 in sleep mode, receives, using the wireless communications link 113, control or management data from the OLT 101.

Step 907

This step corresponds to step 304 in FIG. 3.

In some embodiments, the ONU 103 in sleep mode transmits, using the wireless communications link 113, control or management data or bearer traffic to the OLT 101.

Step 908

This step corresponds to steps 609 and 610 in FIG. 6.

In some embodiments, the ONU 103, in sleep mode, obtains information via the wireless communications link 113 from the OLT 101 about exit out of sleep mode.

Step 909

This step corresponds to step 305 in FIG. 3 and step 610 in FIG. 6.

In some embodiments, the ONU 103 exits sleep mode.

Step 910

This step corresponds to step 306 in FIG. 3 and step 613 in FIG. 6.

In some embodiments, the ONU 103 receives and transmits, using the wireline communications link 104, bearer traffic from and to the OLT 101.

Figure 10:
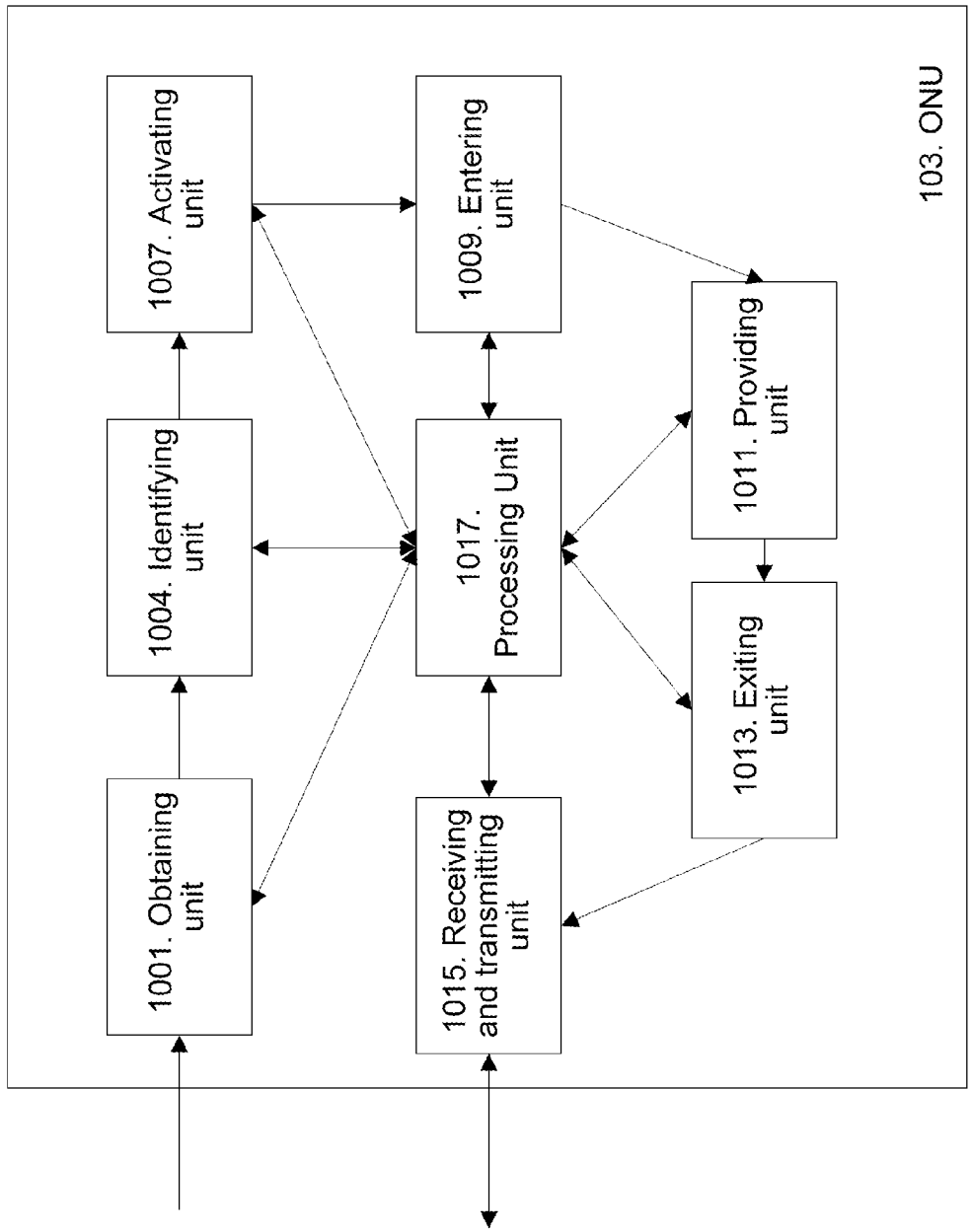
FIG. 10 is a schematic block diagram depicting embodiments of an ONU.

To perform the method steps shown in FIG. 9 for providing wireless connectivity capability to the ONU 103 in the communications network 100, the ONU 103 comprises an arrangement as shown in FIG. 10. The ONU 103 is interconnected to an optical line terminal 101, referred to as an OLT, via a wireline communications link 104 and a wireless communications link 113: The ONU 103 is configured to support a sleep mode.

The ONU 103 comprises an obtaining unit 1001 configured to obtain information about entry into the sleep mode. The ONU 103 further comprises an identifying unit 1004 configured to identify whether the wireless communications link 113 is activated or deactivated. The ONU 103 comprises an activating unit 1007 which is configured to activate the wireless communications link 113 if the wireless communications link (113 is identified as deactivated. Further, the ONU 103 comprises an entering unit 1009 configured to enter sleep mode, and a providing unit 1011 configured to provide wireless connectivity capability to the ONU 103 by means of the wireless communications'link 113 during the sleep mode.

In some embodiments, the obtaining unit 1001 is further configured to obtain, at the ONU 103 in sleep mode, information via the wireless communications link 113 from the OLT 101 about exit out of sleep mode. In some embodiments, the ONU 103 further comprising an exiting unit 1013 configured to exit sleep mode. In some embodiments, the ONU comprises a receiving and transmitting unit 1015 configured to receive and transmit, using the wireline communications link 104, bearer traffic from and to the OLT 101. The receiving and transmitting unit 1015 may further be configured to receive at the ONU 103 in sleep mode, using the wireless communications link 113, control or management data from the OLT 101, and to transmit using the wireless communications link 113, control or management data or bearer traffic from the ONU 103 in sleep mode to the OLT 101.

Figure 11:
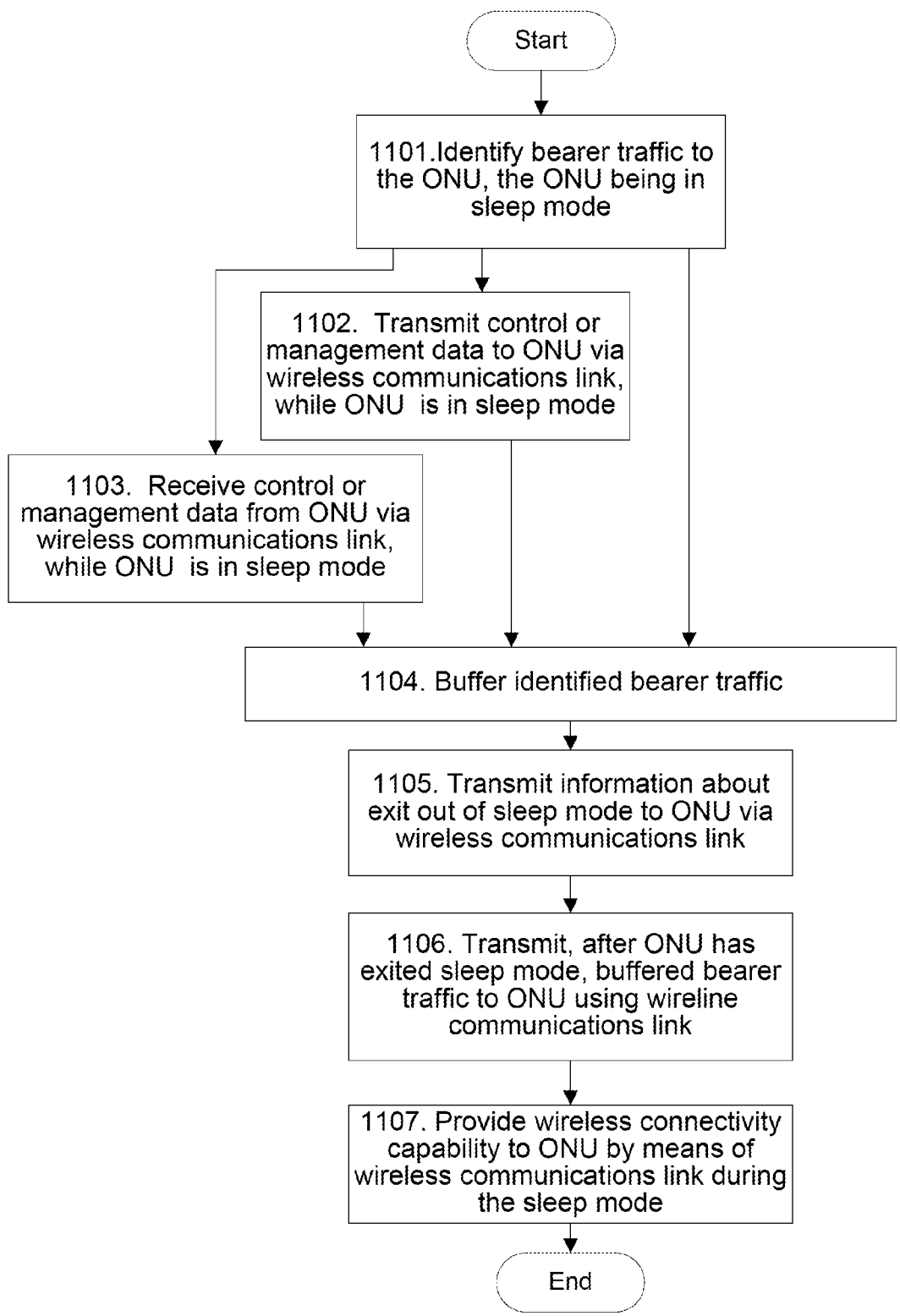
FIG. 11 is a flowchart depicting embodiments of a method in an OLT.

The method described above will now be described seen from the perspective of the OLT 101, referred to as an OLT, in the communications network 100. FIG. 11 is a flowchart describing the present method in the OLT 101, for providing wireless connectivity capability to the optical network unit 103, referred to as an ONU. As mentioned above, the OLT 101 is interconnected to the ONU 103, via a wireline communications link 104 and a wireless communications link 113. The method comprises the further steps to be performed by the OLT 101:

Step 1101

This step corresponds to steps 401 and 402 in FIG. 4 and steps 606 and 607 in FIG. 6.

When the OLT is in sleep mode, the OLT 101 identifies bearer traffic to the ONU 103.

Step 1102

This step corresponds to step 304 in FIG. 3.

In some embodiments, the OLT 101 transmits control or management data to the ONU 103 via the wireless communications link 113, while the ONU 103 is in sleep mode.

Step 1103

This step corresponds to step 304 in FIG. 3.

In some embodiments, the OLT 101 receives control or management data from the ONU 103 via the wireless communications link 113, while the ONU 103 is in sleep mode.

Step 1104

This step corresponds to step 607 in FIG. 6.

The OLT 101 buffers the identified bearer traffic.

Step 1105

This step corresponds to step 304 in FIG. 3, step 404 in FIG. 4 and steps 609 and 610 in FIG. 6.

The OLT 101 transmits information about exit out of sleep mode to the ONU 103 via the wireless communications link 113.

Step 1106

This step corresponds to step 306 in FIG. 3 and step 613 in FIG. 6.

The OLT 10 transmits, after the ONU 103 has exited sleep mode, the buffered bearer traffic to the ONU 103 using the wireline communications link 104.

Step 1107

The OLT 101 provides wireless connectivity capability to the ONU 103 by means of the wireless communications link 113 during the sleep mode.

Figure 12:
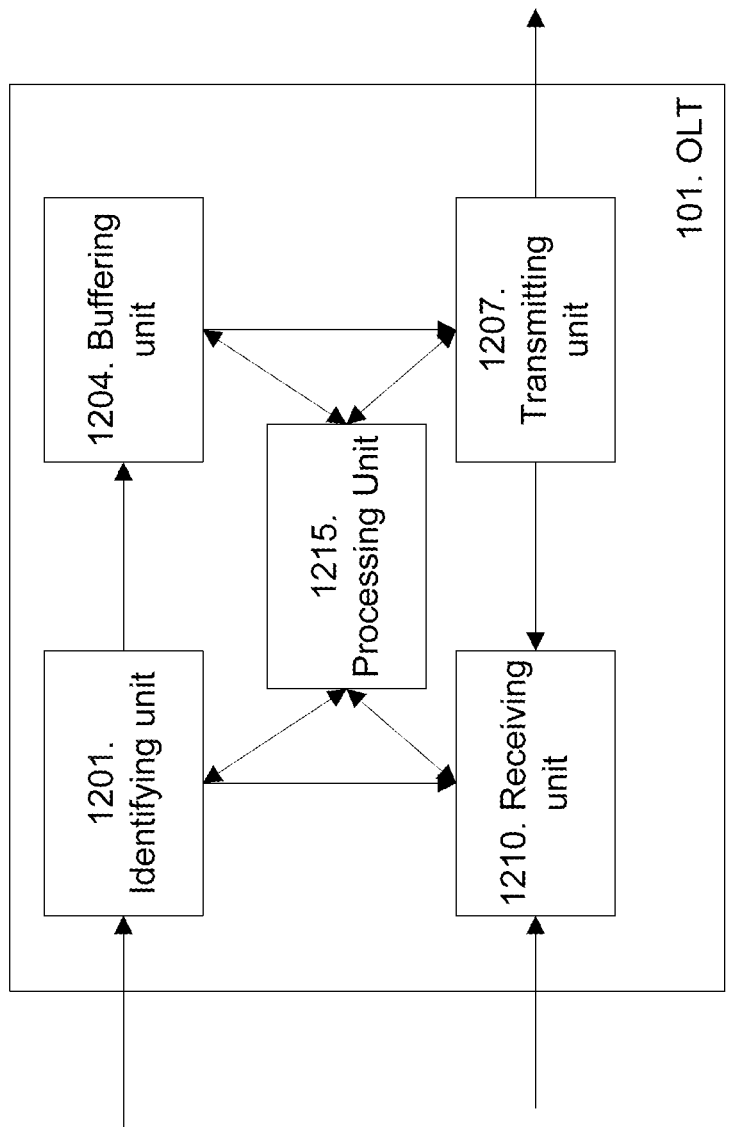
FIG. 12 is a schematic block diagram depicting embodiments of an OLT.

To perform the method steps shown in FIG. 11 for providing wireless connectivity capability to an optical network unit 103, referred to as an ONU, the optical line terminal 101, referred to as OLT, in a communications network 100 comprises an arrangement as shown in FIG. 12. The OLT 101 is interconnected to the ONU 103, via a wireline communications link 104 and a wireless communications link 113. The OLT 101 comprises an identifying unit 1201 which is configured to identify bearer traffic to the ONU 103 when the ONU 103 is in a sleep mode. Further, the OLT 101 comprises a buffering unit 1204 configured to buffer the identified bearer traffic. The OLT 101 comprises a transmitting unit 1207 configured to transmit information about exit out of sleep mode to the ONU 103 via a wireless communications link (113; and configured to transmit, after the ONU 103 has exited sleep mode, the buffered bearer traffic to the ONU 103 using the wireline communications link 104. In some embodiments, the transmitting unit 1207 is further configured to transmit control or management data from the OLT 101 to the ONU 103 via the wireless communications link 113, while the ONU 103 is in sleep mode. In some embodiments, the OLT 101 comprises a receiving unit 1210 configured to receive control or management data from the ONU 103 via the wireless communications link 113, while the ONU 103 is in sleep mode.

Figure 13:
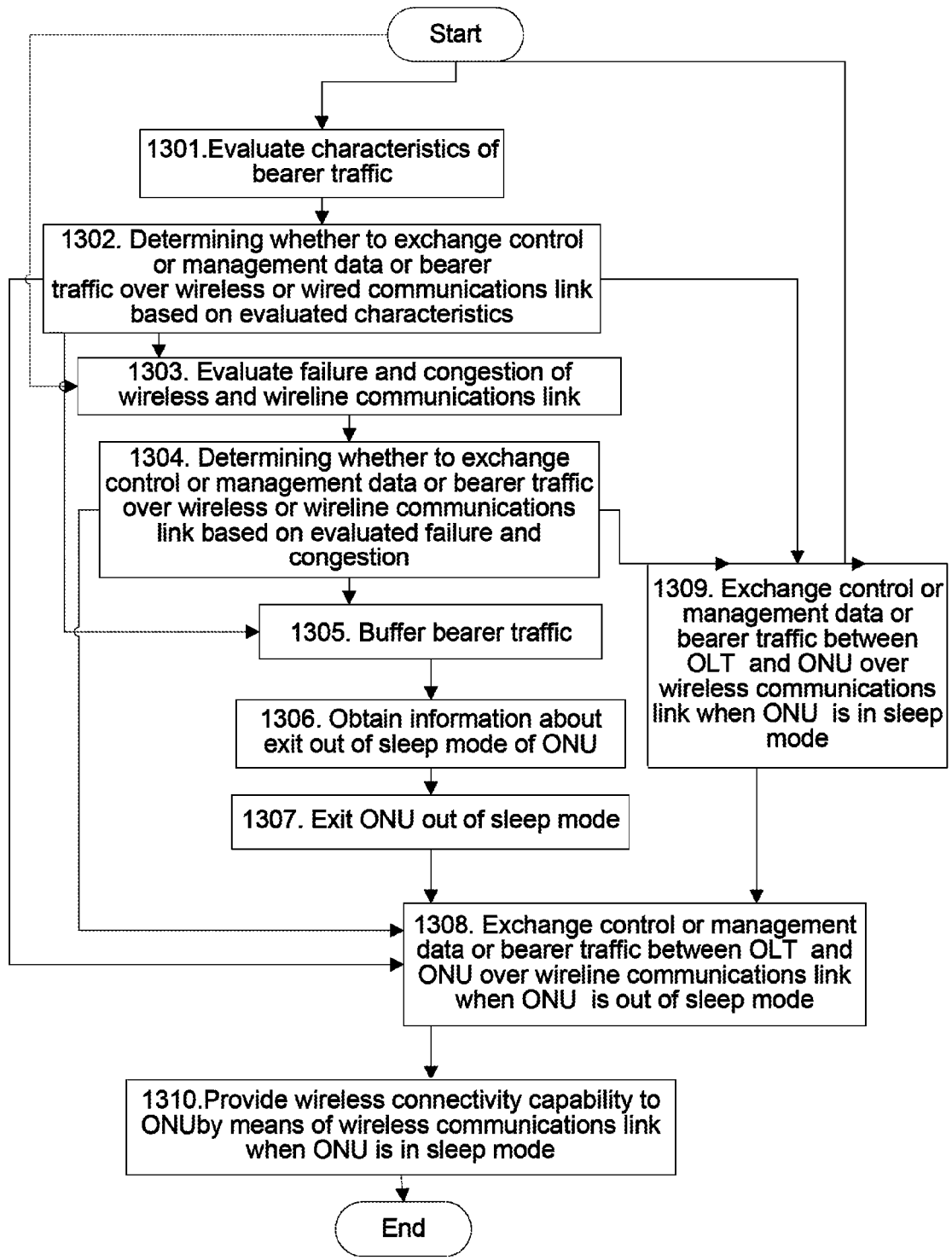
FIG. 13 is a flowchart depicting embodiments of a method in a communications network.

The method described above will now be described seen from the perspective of the communications network 100. FIG. 13 is a flowchart describing the present method in the communications network 100, for providing wireless connectivity capability to an optical network unit 103, referred to as an ONU. As mentioned above the communications network 100 comprises an optical line terminal 101, referred to as an OLT. The OLT 101 and the ONU 103 is interconnected via a wireline communications link 104 and a wireless communications link 113. The OLT 101 and the ONU 103 is configured to support a sleep mode. The method comprises the further steps to be performed by the communications network 100:

Step 1301

In some embodiments, the OLT 101 and the ONU 103 comprised in the communications network 100 evaluates characteristics of the bearer traffic.

Step 1302

In some embodiments, the communications network 100 determines whether to exchange control or management data or bearer traffic over the wireless communications link 113 or the wireline communications link 113 based on the evaluated characteristics of the control or management data or bearer traffic.

Step 1303

In some embodiments, the communications network 100 evaluates failure and congestion of the wireless communications link 113 and the wireline communications link 104.

Step 1304

In some embodiments, the communications network 100 determines whether to exchange control or management data or bearer traffic over the wireless communications link 113 or the wireline communications link 104 based on the evaluated failure and congestion.

Step 1305

This step corresponds to step 607 in FIG. 6.

In some embodiments, the OLT 101 and the ONU 103 buffers the bearer traffic.

Step 1306

This step corresponds to step 304 in FIG. 3, step 404 in FIG. 4 and steps 601 and 610 in FIG. 6.

In some embodiments, the communications network 100 obtains information about exit out of sleep mode of the ONU 103.

Step 1307

This step corresponds to step 305 in FIG. 3 and step 611 in FIG. 6.

In some embodiments, the communications network 100 exits the ONU 103 out of sleep mode.

Step 1308

This step corresponds to step 306 in FIG. 3 and step 613 in FIG. 6.

The communications network 100 exchanges control or management data or bearer traffic between the OLT 101 and the ONU 103 over the wireline communications link 104 when the ONU 103 is out of sleep mode Step 1309

This step corresponds to step 304 in FIG. 3.

The communications network 100 exchanges control or management data and bearer traffic between the OLT 101 and the ONU 103 over the wireless communications link 113 when the ONU 103 is in the sleep mode Step 1310

The communications network 100 provides wireless connectivity capability to the ONU 103 by means of the wireless communications link 113 during the sleep mode.

The present mechanism for providing wireless connectivity capability to an optical network unit 103 in a communications network 100 may be implemented through one or more processors, such as a processing unit 1017 in the ONU 103 depicted in FIG. 10 and a processing unit 1215 in the OLT 101 depicted in FIG. 12, together with computer program code for performing the functions of the embodiments herein. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the embodiments herein when being loaded into the ONU 103 and/or OLT 101. One such carrier may be in the form of a CD ROM disc. It is however feasible with other data carriers such as a memory stick. The computer program code may furthermore be provided as pure program code on a server and downloaded to the ONU 103 and/or OTL 101 remotely.

In summary, when there is downstream traffic of sufficient priority or volume destined for the sleeping ONU 103, the OLT 101 will send a wireless wake-up message through the base station 108 to the ONU 103 to turn on the optical transceiver 203 to receive the buffered downstream traffic. When there is no downstream traffic, or low-volume or low-priority traffic only, the ONU 103 may be permitted to remain asleep indefinitely. In this way, the ONU 103 with wireless connectivity provides an adaptive wake-up mechanism for additional power saving.

In a power saving mode due to AC power failure, an ONU 103 with wireless connectivity may still access the cellular network to provide POTS calls at any time, without awakening the ONU 103. This way, the ONU 103 with wireless connectivity provides longer battery backup life for power shedding and conserves more energy during sleep mode.

Even though the optical transceiver 203 of the ONU 103 is asleep, heartbeat messages may reach the VoIP SIP server to keep a connection active through the wireless connection 113. For IGMP, the IGMP server will periodically send a multicast IGMP query to update its list of active groups, which may be conveyed over the wireless link 113 without awakening the ONU.

The embodiments herein are not limited to the above described preferred embodiments. Various alternatives, modifications and equivalents may be used. Therefore, the above embodiments should not be taken as limiting the scope of the embodiments, which is defined by the appended claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasized that the steps of the methods defined in the appended claims may, without departing from the embodiments herein, be performed in another order than the order in which they appear in the claims.

The invention claimed is:

1. A method in an optical network unit, referred to as an ONU, for providing wireless connectivity capability to the ONU, which ONU is comprised in a communications network, the ONU being interconnected to an optical line terminal, referred to as an OLT, via a wireline communications link and via a wireless communications link, the ONU is configured to support a sleep mode, the method comprising:
   obtaining information about entry into the sleep mode;
   identifying whether the wireless communications link is activated or deactivated;
   activating the wireless communications link if the wireless communications link is identified as deactivated;
   entering sleep mode;
   providing wireless connectivity capability to the ONU by means of the wireless communications link during the sleep mode;
   transmitting, by the ONU in sleep mode, bearer traffic to the OLT via the wireless communications link;
   obtaining, at the ONU in sleep mode, information via the wireless communications link from the OLT about exit out of sleep mode, wherein the information about exit out of sleep mode is a wireless wake-up message;
   exiting sleep mode, responsive to receiving the wireless wake-up message from the OLT; and
   receiving and transmitting, using the wireline communications link, bearer traffic from and to the OLT.

2. The method according to claim 1, further comprising:
   receiving, at the ONU in sleep mode, using the wireless communications link, control or management data from the OLT.

3. The method according to claim 1, further comprising transmitting, using the wireless communications link, control or management data from the ONU in sleep mode to the OLT.

4. An optical network unit, referred to as an ONU, for providing wireless connectivity capability to the ONU, which ONU is comprised in a communications network, the ONU being interconnected to an optical line terminal, referred to as an OLT, via a wireline communications link and via a wireless communications link, the ONU is configured to support a sleep mode, the ONU comprising:
   at least one microprocessor;
   a non-transitory computer-readable storage medium, further including computer-readable instructions, when executed by the at least one microprocessor, are configured to:
      obtain information about entry into the sleep mode;
      identify whether the wireless communications link is activated or deactivated;
      activate the wireless communications link if the wireless communications link is identified as deactivated;
      enter sleep mode;
      provide wireless connectivity capability to the ONU by means of the wireless communications link during the sleep mode;
      transmit, while in sleep mode, bearer traffic to the OLT via the wireless communications link;
      obtain information via the wireless communications link from the OLT about exit out of sleep mode, wherein the information about exit out of sleep mode is a wireless wake-up message;
      exit sleep mode, responsive to receiving the wireless wake-up message from the OLT; and
      receive and transmit, using the wireline communications link, bearer traffic from and to the OLT.

* * * * *

UNITED STATES PATENT AND TRADEMARK OFFICE
CERTIFICATE OF CORRECTION

PATENT NO. : 8,958,699 B2  
APPLICATION NO. : 13/053925  
DATED : February 17, 2015  
INVENTOR(S) : Huang et al.

It is certified that error appears in the above-identified patent and that said Letters Patent is hereby corrected as shown below:

In the specification

Column 1, Line 18, delete "providers" and insert -- provider's --, therefor.

Column 1, Line 62, delete "power time." and insert -- power*time. --, therefor.

Column 4, Line 4, delete "(wireless" and insert -- wireless --, therefor.

Column 8, Line 62, delete "ONU 1103" and insert -- ONU i 103 --, therefor.

Column 9, Line 20, delete "ONU 1103" and insert -- ONU i 103 --, therefor.

Column 9, Line 25, delete "ONU 1103" and insert -- ONU i 103 --, therefor.

Column 9, Line 34, delete "ONU 1103." and insert -- ONU i 103. --, therefor.

Column 9, Line 49, delete "ONU 1103," and insert -- ONU i 103, --, therefor.

Column 9, Line 58, delete "ONU 1103" and insert -- ONU i 103 --, therefor.

Column 9, Line 66, delete "ONU 1103" and insert -- ONU i 103 --, therefor.

Column 10, Line 4, delete "ONU 1103" and insert -- ONU i 103 --, therefor.

Column 12, Line 2, delete "However;" and insert -- However, --, therefor.

Column 13, Line 57, delete "113:" and insert -- 113. --, therefor.

Column 14, Line 3, delete "communications'link" and insert -- communications link --, therefor.

Signed and Sealed this  
Nineteenth Day of January, 2016

Michelle K. Lee  
*Director of the United States Patent and Trademark Office*